United States Patent [19]
Price et al.

[11] 3,953,142
[45] Apr. 27, 1976

[54] WEDGE MOUNTED MACHINE ELEMENT

[75] Inventors: Connor E. Price; William J. Derner, both of Indianapolis, Ind.

[73] Assignee: FMC Corporation, San Jose, Calif.

[22] Filed: Sept. 28, 1973

[21] Appl. No.: 401,755

Related U.S. Application Data

[62] Division of Ser. No. 265,010, June 21, 1972, Pat. No. 3,806,215.

[52] U.S. Cl. ............................. 403/371; 308/236; 403/16; 403/409
[51] Int. Cl.² ..................... F16B 2/14; F16B 7/04
[58] Field of Search ............ 308/236; 403/16, 351, 403/352, 371, 374, 409, 367, 368; 287/DIG. 7

[56] References Cited
UNITED STATES PATENTS

| | | | |
|---|---|---|---|
| 438,768 | 10/1890 | Reine | 403/191 |
| 718,727 | 1/1903 | Potstada | 403/351 |
| 913,992 | 3/1909 | Steen | 403/351 |
| 1,771,949 | 7/1930 | Blanchard | 287/DIG. 7 |
| 2,228,282 | 1/1941 | Miller | 403/371 |
| 2,475,042 | 7/1949 | McCloskey | 287/DIG. 7 |

FOREIGN PATENTS OR APPLICATIONS

| | | | |
|---|---|---|---|
| 1,373,624 | 8/1964 | France | 403/369 |
| 272,852 | 7/1965 | Australia | 403/369 |

*Primary Examiner*—Andrew V. Kundrat
*Assistant Examiner*—Conrad L. Berman
*Attorney, Agent, or Firm*—J. F. Verhoeven; C. E. Tripp

[57] ABSTRACT

A wedge-shaped sleeve is inserted between the inner race of a bearing and a shaft to clamp the bearing to the shaft. The sleeve, which is resilient with a longitudinal slit, has a rib thereon to engage a groove in the bearing race to hold the sleeve and bearing in assembled relation when the sleeve is relaxed. An alternative sleeve, which is split to constitute two separate halves, is disclosed. There is also shown a bearing mounted in a bore in which the tapered sleeve is received between the bore and the outer race of the bearing.

4 Claims, 8 Drawing Figures

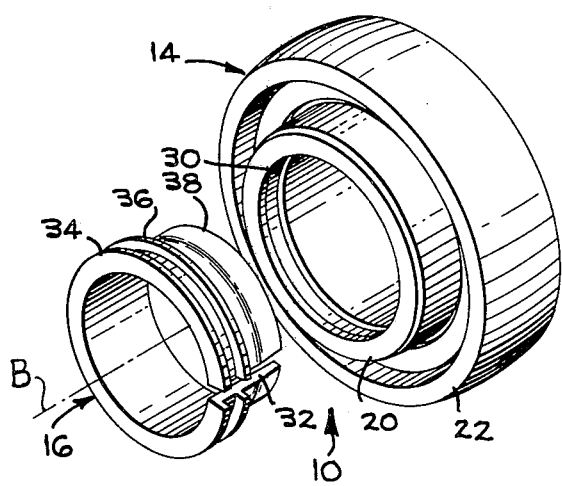
FIG_1
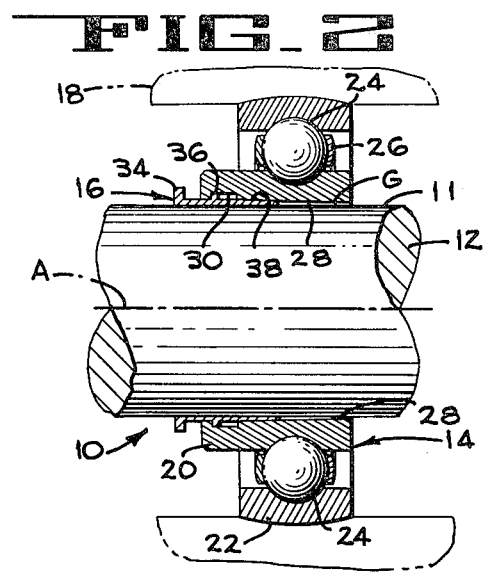
FIG_2
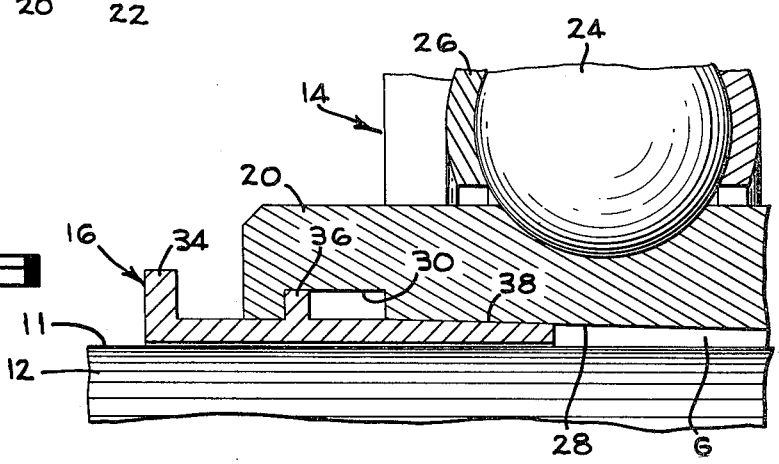
FIG_3
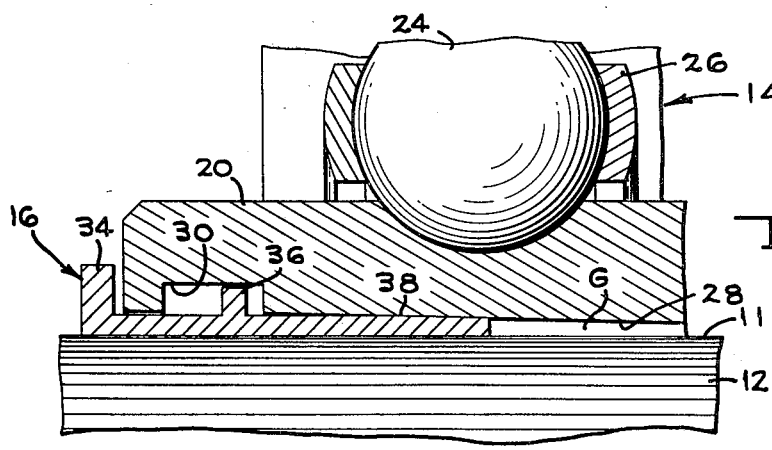
FIG_4

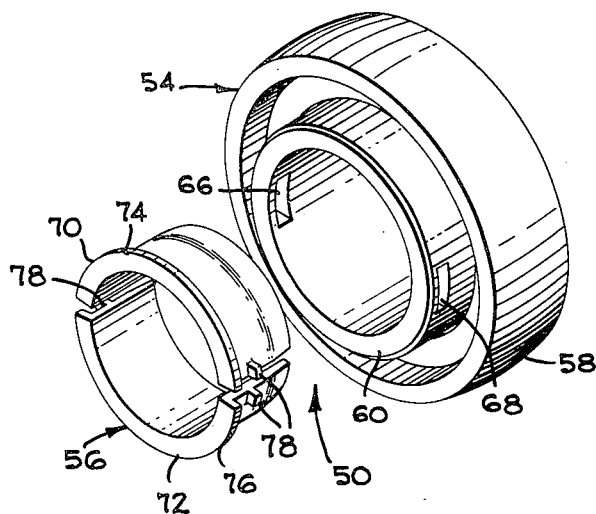
FIG_5
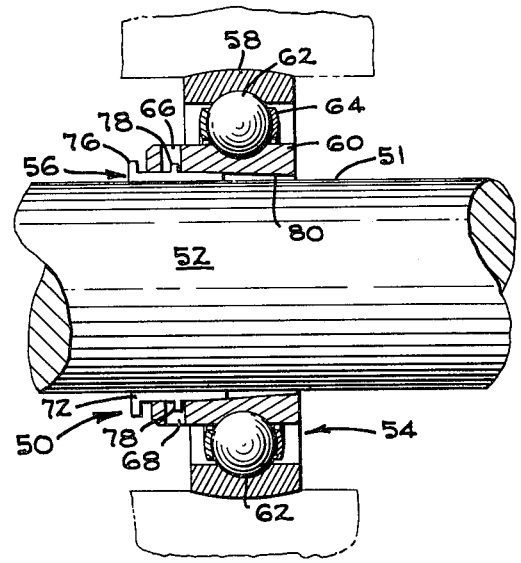
FIG_6
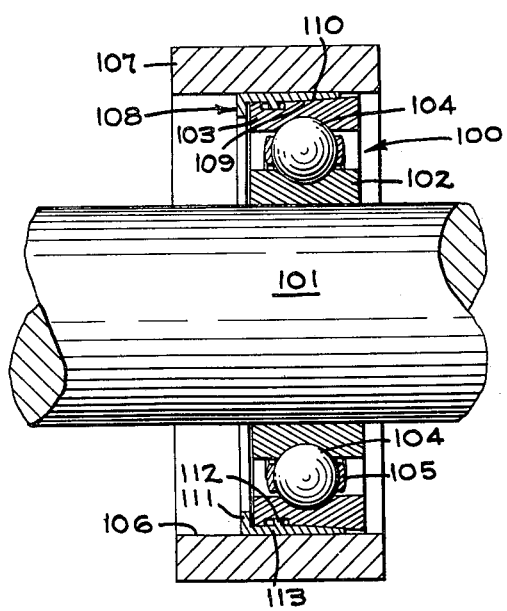
FIG_7
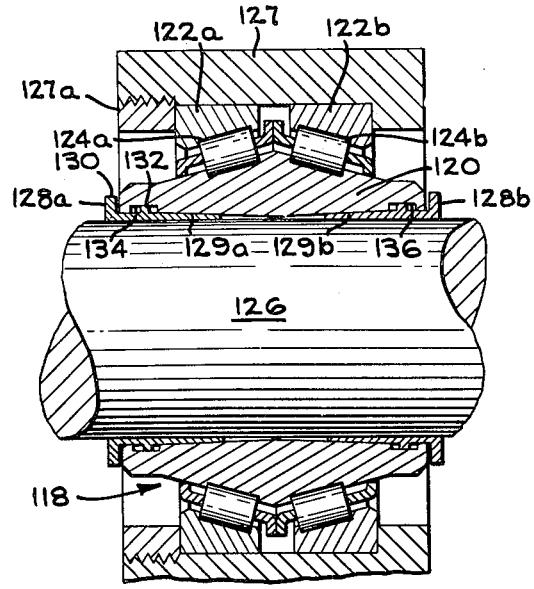
FIG_8

WEDGE MOUNTED MACHINE ELEMENT

This is a division of application Ser. No. 265,010, filed June 21, 1972, now Pat. No. 3,806,215.

BACKGROUND OF THE INVENTION

The present invention relates to the clamping of machine elements or members, such as bearings, sleeves, sprockets, gears, or the like, to a mounting surface.

Many bearings used in light or medium duty applications are conventionally fitted loose to a shaft and held at one end of an extended inner ring by a collar and setscrew. Such mounting of the bearing, which provides only limited points of contact, often results in excessive fretting and/or inner ring breakage.

It is known to use, in the mounting of anti-friction bearings on a shaft, a wedge-shaped sleeve as shown, for example, in U.S. Patent No. 1,116,845, U.S. Pat. No. 1,957,062, U.S. Pat. No. 2,045,896, U.S. Pat. No. 2,052,108, U.S. Pat. No. 2,098,709, U.S. Pat. No. 2,118,891, U.S. Pat. No. 2,213,400, U.S. Pat. No. 2,228,282, U.S. Pat. No. 2,230,912, U.S. Pat. No. 2,714,538 and U.S. Pat. No. 2,970,018. One problem with the use of a mounting sleeve is that it not only adds parts to the assembly, but increases the time and difficulty of mounting the bearing. Frequently, additional parts, such as collars, locknuts, lockwashers, setscrews, and/or springs are required to clamp the bearing to the shaft. It will be recognized that each different sized bearing will require different sized sleeves and auxiliary parts which must be separately stored and brought together for assembly. Similar difficulties exist in the use of sleeves to mount other machine elements.

SUMMARY OF THE INVENTION

In the present invention a simple, effective mounting of a machine element or members, such as a bearing, on a shaft or in a bore, by means of a wedge sleeve, is effected without the complexity usually associated with wedge sleeve element mountings.

In brief, the wedge mounting sleeve, which is resilient, is normally loosely engaged with the machine element by means of complementary surface conformations on the respective members. The sleeve is resilient and, in the relaxed condition, will remain engaged with the machine element. Thus, a machine element, such as a bearing, and the appropriate sleeve therefor, can be shipped, stored, and transported to the assembly area for use, as a single unit. Although the bearing and wedge sleeve are held in assembled relation even after assembly on the shaft or in the bore, the wedge sleeve can move axially with respect to the bearing for wedging action by virtue of the loose connection therebetween. When the resilient sleeve and bearing are removed from the shaft or bore, the resilient sleeve can be momentarily deformed for assembly with, or disassembly from, the bearing.

In the preferred form of the invention, the wedge sleeve has a longitudinal slit which permits the sleeve to expand or contract. The sleeve also has a rib which is adapted for receipt in a wide groove in the bearing. If we assume that the bearing is to be mounted on a shaft, a portion of the inner surface of the inner race of the bearing and the outer surface of the sleeve member will be oppositely tapered to define complementary wedge surfaces for a wedging action therebetween.

At some time prior to mounting on a shaft, the sleeve member is manually compressed so that the sleeve, which has the coupling rib on the outer surface, can be inserted into the inner race of the bearing where the coupling rib is received in the groove which is in the internal surface of the inner race member of the bearing. As thus assembled, the two parts can be shipped and stored together to eliminate the possibility of mismating the parts as the bearing is assembled on the shaft. The wedge sleeve and bearing are mounted on the shaft as a unit and the wedge sleeve is pushed into the inner race of the bearing (which is possible by virtue of the loose fit of the collar in the groove) to compress the sleeve into tight gripping relationship with the shaft and to wedge the inner race of the bearing tightly onto the wedge sleeve.

If the bearing is to be mounted into a bore, the wedge sleeve is forced between a wedge surface on the outer race of the bearing and the bore.

In mounting the bearing either on a shaft or in a bore, a divided wedge sleeve can be used and, instead of a rib, projections can be provided on the wedge sleeve for mating engagement with a groove or holes in the bearing.

Thus, the machine element mounting construction of the present invention comprises a machine element and wedge sleeve which can be shipped and stored as a unit without danger of disassembly, and can be tightly clamped on a shaft (or, in a modified form, in a bore) without the need of auxiliary parts.

BRIEF DESCRIPTION OF THE DRAWINGS

FIG. 1 is a view in perspective of a sleeve and bearing constructed in accordance with the present invention in disassembled relationship.

FIG. 2 is a view in cross-section of the sleeve and bearing of FIG. 1 when assembled and mounted on a shaft.

FIGS. 3 and 4 are enlarged, fragmentary views taken as the view of FIG. 3 showing the sleeve in a nonclamping position and in a clamping position, respectively.

FIG. 5 is a view similar to FIG. 1, showing a modified form of the sleeve and bearing.

FIG. 6 is a view in cross-section of the sleeve and bearing of FIG. 5 when assembled and mounted on a shaft.

FIG. 7 is a view similar to FIG. 6 of yet another modified form of the sleeve and bearing.

FIG. 8 is a view in cross-section of a bearing mounted on a shaft with two sleeves.

DESCRIPTION OF THE PREFERRED EMBODIMENTS

There is shown in FIGS. 1 and 2 a bearing mounting construction 10 adapted for receipt on a mounting surface 11 which is the outer cylindrical surface of shaft 12, having a central axis A. The bearing mounting construction 10 consists of a bearing 14, and an axially extending wedge-shaped sleeve member 16 having a central axis B. The sleeve member 16 is wedged between the shaft and the bearing to clamp the bearing tightly on the shaft even though the bearing is significantly larger than the shaft. It will be understood that, in the usual installation, the bearing 14 will support another member such as a hub, or will be received in another member such as a housing. For purposes of this disclosure, a member 18 is shown in dashed lines with the understanding that there is relative rotation between the member 18 and the shaft 12, regardless of the function of the member 18. Although the bearing 14 shown for illustrative purposes is a ball bearing, it should be noted that the mounting construction of the present invention is as suitable for other machine elements or members, including a roller bearing or a sleeve bearing, as for the ball bearing shown.

The bearing 14 has an inner race member 20, an outer race member 22, and an intermediate circle of balls 24 which are held in a retainer ring 26. The inner race of the bearing has an inner tapered surface 28 and an internal circular groove 30 extending completely around the race.

Regardless of the type of bearing, it sometimes happens that the annular inner race of the bearing has a slightly larger diameter than the shaft on which it is to be mounted or in the case of an outer race, a slightly smaller diameter than the housing bore diameter. This is more often true with bearings designed to carry light to medium loads. Frequently, with this class of bearing, the inner race is extended axially to receive a set screw or screws therein by which the inner race, and thus the bearing, is secured to the shaft. Sometimes, a clamping collar is utilized to hold the inner race of the bearing on the shaft. Neither the set screw nor the clamp collar is effective to hold the bearing on the shaft as tightly as is required for many applications.

The wedge-shaped sleeve 16, which is normally made of formed or turned steel, has a longitudinal slit 32 extending the entire length of the sleeve. The sleeve is resilient and can be, by virtue of the slit, expanded or contracted. The sleeve has integral therewith two ribs 34, 36 extending outwardly. One rib 34 is at one end of the sleeve and the other rib 36 is spaced inwardly therefrom. The outer surface of a portion of the sleeve (that portion most remote from end rib 34) is tapered to define a tapered skirt portion 38.

With reference to FIG. 1, it should be noted that the sleeve 16 can be compressed, or deformed, (manually or with a levered tool) so that the sleeve can be inserted into the inner race of the bearing 14. When the sleeve, which is resilient, is released to return to its relaxed condition, the inner rib 36 will be confined loosely in the groove 30 in the inner race member. Since the groove 30 is considerably wider than the rib 36, the rib can be shifted axially with respect to the bearing but will not become disengaged therefrom as long as the sleeve member is in its relaxed condition. It is only by again compressing the sleeve to disengage the rib from the groove that the sleeve and bearing can be separated. Thus, the rib, or projection, 36 and the groove, or cavity, 30 define surface conformations normally holding the sleeve and bearing in assembled relationship as long as the sleeve is relaxed. The merit in this construction is that the bearing, with the appropriate sleeve, can be shipped and stored as a unit, to considerably reduce the handling of the parts, to minimize the storage facilities required, and to eliminate the possibility of mismatching the bearing and sleeve at assembly.

To install the bearing assembly, or bearing mounting construction, on the shaft, the bearing and sleeve, preassembled into a unit, are slid over the shaft. The sleeve, in its relaxed state (as it is when the rib 36 is engaged loosely in groove 30) fits loosely on the shaft 12 and can be shifted easily to any position thereon. At this time, the sleeve will be positioned relative to the inner bearing race as shown in FIG. 3, with the surface projection 36 in a first unlocked position within the cavity 30.

To tighten the sleeve on the shaft and clamp the bearing in position on the shaft, the sleeve member is driven to the right, as by the application of force, to the position in the race 20 shown in FIG. 4, with the surface projection 36 in a second locked position within the cavity 30. As the sleeve member moves to the right relative to the race, it is contracted (by virtue of the wedging action between the tapered surfaces on the sleeve and the inner race member) and tightens on the shaft. At the same time, the bearing is tightened with respect to the shaft because the wedge-shaped sleeve member is being driven into a gap G between the inner race member and the shaft which narrows toward the right (as viewed in FIGS. 3 and 4) because of the taper portion on the inner surface 28 of the inner race member. It should be noted that in the tightened position of the bearing illustrated in FIG. 4, the end rib 34 is spaced slightly from the radial end face of the inner race 20 of the bearing. Thus, a tapered tool, such as a screwdriver, or a special tool, can be inserted into the gap between the rib and the radial face for loosening of the wedge 16 (to the position shown in FIG. 3) and removal of the bearing.

A second embodiment of the invention is shown in FIGS. 5 and 6. In this embodiment the bearing assembly 50, which is to be clamped to the mounting surface 51 on shaft 52, also consists of a bearing member 54 and a sleeve member 56. The bearing member 54 has an outer race 58, an inner race 60, and intermediate anti-friction members which can be balls or rollers, but which are illustrated as balls 62. A retainer 64 holds the circle of balls in proper position in the bearing. In this embodiment, the inner race member has no circular groove. Instead, two cavities, or openings 66, 68, 180° apart, extend through or partly through the inner race member. The sleeve member 56 is made up of two separable halves 70, 72 each having an outer half rib 74, 76 and each having a pair of projections 78 thereon spaced from the rib. Each projection is at the side margin of the half sleeve, so the projections on each half-sleeve are almost 180° apart.

The inner surface of the inner race member 60 has a tapered skirt portion 80 (which may or may not be for full length) as the inner race member of FIGS. 1 to 4, and the outer surface of the sleeve member is tapered as the sleeve member 16. The sleeve member 56 can be compressed (by pressing at the junction of the two halves) for insertion into the bearing and, when the pressure on the sleeve member is relaxed, the projections 78 will be loosely confined by the openings 66, 68 in the inner race member. As can be seen in FIG. 5, one projection on each sleeve half will be received in opening 66 and one projection on each sleeve half will be received in opening 68. Thus each opening will receive two sleeve member projections. It should be noted that a split sleeve with projections, constructed as the sleeve 56, could, if desired, be used in conjunction with a bearing having an inner race constructed with a groove as the race 20 of FIG. 1.

As in the first embodiment described, the sleeve member 56 can be shipped and stored in engagement with the bearing 54, and the two sleeve halves will remain engaged with the bearing in their relaxed condition. As in the first embodiment, the two sleeve halves can be secured between the inner race member and the shaft, to tightly hold the bearing to the shaft. Also, the bearing can be removed from the shaft in a manner similar to the manner in which bearing 10 is removed from the shaft although it might be necessary to wedge each half of the sleeve loose.

Both the embodiment of FIGS. 1 to 4, and the embodiment of FIGS. 5 and 6, relate to bearing assemblies in which the bearing is secured tightly to a shaft extending into the inner race of the bearing. In installations like those illustrated, a member, such as a hub or housing, is usually received on the outer race member, and the hub or housing can be tightly secured to the outer race member in the same manner as the inner race member is secured to the shaft. Alternatively, the outer race member only can be clamped to a clamping surface of the hub or bore as shown in FIG. 7.

A bearing 100 is received on shaft 101. The bearing has an inner race member 102 received on the shaft, an outer race member 103, and a circle of balls 104 therebetween held in retainer or cage 105. The bearing and shaft are received in a bore 106 of a housing 107. The bearing 100 is tightly secured in the bore by means of a sleeve member 108. The sleeve member 108 has a tapered inner surface portion 109 and the outer race member 103 has an outer surface portion 110 tapered in a complementary fashion. The sleeve member has an end rib 111 and a locking rib 112 spaced therefrom. Both ribs extend inwardly from the inner surface of the sleeve member, and the locking rib is received loosely in a groove 113 on the outer surface of the outer race member. The sleeve member has a slit (not shown) which extends the entire length of the sleeve member (as the slit 32 of sleeve member 16).

The sleeve member can be expanded, by applying pressure at two points (90° clockwise and 90° counterclockwise from the slit). The expanded sleeve member can fit over the outer race member until the locking rib 112 is in registration with the groove 113, at which time pressure is removed from the sleeve member to permit it to return to the relaxed condition. In the relaxed condition, the rib 112 is held in the groove 113. When the sleeve member 108 is forced in between the bore 106 and the outer race 103 of the bearing, the bearing will be tightly secured in the bore.

It should be noted that the bearing 100 and sleeve member 108 can be shipped and stored in assembled relation, and the two members will be held together as long as the sleeve member is in the relaxed condition.

Both the inner race and the outer race of a bearing can be tightly secured on a shaft and in a bore, respectively, by means of sleeve members, as shown separately in FIG. 2 and FIG. 7. In other words, a sleeve member with an outwardly extending rib can engage a groove in the inner surface of the inner race of a bearing, and a sleeve member with an inwardly extending rib can engage a groove in the outer surface of the outer race member of the same bearing. This preassembled unit of a bearing and two sleeve members will fit loosely in a bore and will receive a shaft loosely in the inner bearing race. When the inner sleeve member is driven in, the inner race of the bearing will be tightly clamped on the shaft. When the outer sleeve member is driven in, the outer race of the bearing will be tightly clamped in the bore.

In some instances, as when greater loads are involved, it may be desired to secure a bearing on a shaft by means of two opposite wedge sleeves, as shown in FIG. 8. In this embodiment, a roller bearing 118 having an inner race 120, outer races 122a, 122b, and two rows of rollers 124a, 124b, is mounted on a shaft 126. The bearing 118 is secured in housing 127 by nut 127a. Two wedge sleeves 128a, 128b, both similar to the wedge sleeve 16 shown in FIG. 1, extend in from opposite directions between the tapered surfaces 129a, 129b of the inner race 120, and the shaft 126. Both sleeves 128a, 128b, have inboard and outboard ribs, 130 and 132 respectively, the inboard ribs defining locking ribs received in the grooves 134, 136 of the inner race. The two wedge sleeves are joined to the bearing 118 in the same manner as the sleeve 16 to bearing 10, so that the three parts can be shipped and stored as a unit.

Although the best mode contemplated for carrying out the present invention has been herein shown and described, it will be apparent that modification and variation may be made without departing from what is regarded to be the subject matter of the invention.

What is claimed is:

1. A mounting construction for receipt on a shaft comprising a machine element having a longitudinal axis and having an inner wedge surface surrounding said axis, said machine element having a circumferential groove on the inner surface thereof, a sleeve for receipt within said machine element, said sleeve having a central axis and having an outer wedge surface tapering inwardly toward one end for wedging action with said inner element surface, the other end of said sleeve member extending axially beyond the machine element, said sleeve having a longitudinal axis and having a circumferential first rib on the outer surface thereof narrower than the groove for receipt of the rib in said groove, said first rib disposed intermediate the ends of said sleeve with said outer wedge surface lying between said rib and said one end of said sleeve, said sleeve being resilient to permit assembly of said machine element and said sleeve and to permit engagement of said rib in said groove, said sleeve and said groove having edges perpendicular to said axes to hold the machine element and the sleeve together in a positive manner in any relative angular position when the sleeve is relaxed, said sleeve slidable to a limited extent relative to the machine element as the first rib moves linearly parallel to said axis from one side of the groove to the other from a first unlocked position to a second locked position, said sleeve having a longitudinal slit therein for contraction by wedging action between said wedge surfaces to clamp tightly on a shaft, said sleeve compressible when the machine element and said sleeve assembly are off the shaft to release said first rib on the sleeve from the groove in the machine element, and a radially extending second rib on said other end of said sleeve in spaced relation to the machine element when the sleeve is positioned with the first rib in said second locked position.

2. A mounting construction comprising a machine member having a longitudinal axis and having an inclined inner wedge surface, said machine member having a pair of opposed cavities therein, a split sleeve having an inclined outer wedge surface therealong at one end for wedging engagement with said machine member wedge surface, said sleeve having an opposite end extending beyond the end of the machine member, each half of said split sleeve having releasable locking projections disposed between the ends thereof and of lesser axial extent than said cavities for extension loosely into said cavities and for limited axial movement therein, each half of said split sleeve being resilient to permit assembly of said sleeve halves and said machine member and to permit engagement of said projections into said cavities, said split sleeve halves movable axially to a limited extent for wedging engagement with the machine element and said projections on the split sleeve halves moving from a first unlocked position to a second locked position as said sleeve halves move axially, and radially extending rib-like projections on said opposite ends of said split sleeve halves.

3. A mounting construction for clamping a machine member to a mounting surface, said machine member surrounding a central axis, said machine member having at least one axially extending tapered surface and having radially extending surfaces, an axially extending sleeve member having a central axis essentially coincident with the central axis of said machine member and having one end extending beyond said machine member when the sleeve and the machine member are in assembled relationship, said sleeve member having an axially extending tapered wedge surface extending therealong adjacent the opposite end of said sleeve member and in complementary relationship with the axially extending machine member tapered surface for wedging action therewith, said sleeve member having a longitudinal slit therethrough to render the sleeve member deformable to change the diameter thereof, a releasable locking projection on one of said members intermediate the ends thereof, a cavity on the other of said members of greater axial span than said projection, said sleeve member being resilient to permit assembly of said members and engagement of said projection in said cavity, said cavity normally confining said projection in said cavity in any relative angular position of said members with a limited linear axial lost motion therebetween when the sleeve member is relaxed to hold the sleeve member and the machine member in assembled relationship and to permit relative movement of said projection and said cavity parallel to the central axis of said sleeve member from a first unlocked position to a second locked position as the sleeve member is urged into wedging relationship with the machine member, said projection and said cavity having edges substantially perpendicular to said axes and said members disengageable on deformation of the sleeve member, and a radially extending external rib at said one end of said sleeve member.

4. A mounting construction comprising a machine member having an outer tapered wedge surface of circular cross-section, said wedge surface having a circumferentially extending groove therein, a resilient sleeve member having a central axis and having a tapered inner wedge surface at one end for wedging engagement with said outer tapered wedge surface, the other end of said sleeve member extending beyond the end of said machine member, said sleeve having a circumferentially extending rib thereon disposed between the ends of said sleeve and narrower than said groove for loose engagement in said groove and limited axial movement therein, said rib and groove having substantially perpendicular edges to hold the members together in any relative angular position of said members, said sleeve having an elongated slit therein for momentary deformation of the sleeve to permit assembly of said members and engagement of said rib in said groove, said rib moving parallel to said axis from a first unlocked position in said groove to a second locked position therein as said sleeve is wedged into said machine member, and a radially extending external rib at said other end of said sleeve member.

* * * * *